United States Patent [19]

Sawada et al.

[11] Patent Number: 5,364,176
[45] Date of Patent: Nov. 15, 1994

[54] BRAKING PRESSURE CONTROL APPARATUS IN A WHEEL SLIP CONTROL SYSTEM

[75] Inventors: Masashi Sawada, Chiryu; Hiroaki Takeuchi, Toyota, both of Japan

[73] Assignee: Aisin Seiki Kabushiki Kaisha, Kariya, Japan

[21] Appl. No.: 111,956

[22] Filed: Aug. 26, 1993

[30] Foreign Application Priority Data

Aug. 28, 1992 [JP] Japan .................................. 4-230282

[51] Int. Cl.$^5$ .............................................. B60T 8/58
[52] U.S. Cl. .............................. 303/113.2; 303/115.1; 303/116.1; 303/119.1
[58] Field of Search ............... 303/113.2, 113.1, 115.1, 303/116.1, 116.2, 119.1; 364/426.02, 426.03

[56] References Cited

U.S. PATENT DOCUMENTS

| | | | |
|---|---|---|---|
| 3,532,391 | 10/1970 | Klein | 303/116.1 |
| 4,453,782 | 6/1984 | Arikawa et al. | 303/116.1 |
| 4,878,715 | 11/1989 | Toda | 303/116.1 |
| 4,950,038 | 8/1990 | Ocvirk et al. | 303/113.2 |
| 5,039,176 | 8/1991 | Hellmann et al. | 303/116.1 |
| 5,048,899 | 9/1991 | Schmitt et al. | 303/113.2 |
| 5,169,216 | 12/1992 | Schmidt et al. | 303/116.2 |
| 5,251,971 | 10/1993 | Reinartz et al. | 303/119.1 X |

FOREIGN PATENT DOCUMENTS

58-202142 11/1983 Japan .
63-28782 2/1988 Japan .
4-215553 8/1992 Japan .

*Primary Examiner*—Robert J. Oberleitner
*Assistant Examiner*—Peter M. Poon
*Attorney, Agent, or Firm*—Burns, Doane, Swecker & Mathis

[57] ABSTRACT

The invention is directed to a braking pressure control apparatus for controlling a wheel slip of a driven wheel during braking and driving operations, wherein pressure control valves are disposed in the fluid passage between a master cylinder and a wheel brake cylinder, and a changeover valve is disposed in the passage between the master cylinder and the pressure control valves, for blocking the flow of the brake fluid when the wheel slip of the driven wheel is controlled during the driving operation. A first reservoir having a first variable volume chamber for storing the brake fluid discharged from the wheel brake cylinder is provided and normally urged to be of its minimum volume. Also, a second reservoir having a second variable volume chamber for storing the brake fluid discharged from the wheel brake cylinder is provided and normally urged to expand for storing a predetermined amount of the brake fluid. A fluid pump is provided for pumping the brake fluid from the first and second reservoirs, and supplying the pumped brake fluid to the passage between the pressure control valves and the changeover valve in the wheel slip control during the braking and driving operations. Thus, the apparatus may be easily installed in a conventional braking system without any change to the master cylinder reservoir.

12 Claims, 4 Drawing Sheets

BRAKING PRESSURE CONTROL APPARATUS IN A WHEEL SLIP CONTROL SYSTEM

BACKGROUND OF THE INVENTION

1. Field of the Invention

The present invention relates to a braking pressure control apparatus in a wheel slip control system of an automotive vehicle having a hydraulic braking system, and more particularly to a braking pressure control apparatus for controlling the wheel slip during a braking operation and the wheel slip during a driving operation to appropriately control the braking force applied to wheels when the vehicle is braked or accelerated.

2. Description of the Prior Art

A braking pressure control apparatus for controlling the wheel slip during the braking and driving operations is disclosed in a Japanese Patent Laid-open Publication No. 63-28782, for example. The apparatus disclosed in the Publication provides a brake slip control (i.e., controlling the wheel slip during the braking operation) and a traction slip control (i.e., controlling the wheel slip during the driving operation) and includes a wheel brake cylinder communicating with a master cylinder and a reservoir through electromagnetic valves, i.e., direction control valves which serve as an inlet side valve and an outlet side valve disposed in each wheel. Also provided for the traction slip control is an electromagnetic valve of a direction control valve which is provided in each fluid passage from a master cylinder to the inlet side valve for a driven wheel, and which is normally placed in its open position and closed in the traction slip control. And, an auxiliary pressure supply device is disposed between the inlet side valve for the driven wheel and the direction control valve to be closed in the traction slip control. The auxiliary pressure supply device has a reservoir for storing a brake fluid, and fluid pressure pumps driven by an electric motor.

In a driving slip control apparatus as disclosed in a Japanese Patent Laid-open Publication No. 58-202142, a return pump is formed as a suction pump, and an inlet port of the return pump is communicated with a passage between a master cylinder and an electromagnetic valve for use of the wheel slip control during the driving operation, through a valve which communicates the inlet port of the pump with the master cylinder when the pressure at the inlet port becomes less than a predetermined value.

Further, Japanese Patent Laid-open Publication No. 4-215553 discloses a brake apparatus having means for limiting the slip during the driving operation. This apparatus includes an accumulator which can be communicated with an inlet port of a return pump through a valve to be opened electrically. The master cylinder serves as a power source for supplying a brake fluid into the accumulator, which is communicated with a reservoir associated with a master cylinder.

According to the prior apparatus disclosed in the Publication No. 63-28782, a passage for communicating the fluid pump with the reservoir associated with the master cylinder, i.e., master cylinder reservoir is necessary, and the brake fluid of the master cylinder reservoir is consumed when the wheel slip control during the driving operation is achieved, so that the master cylinder reservoir has to be specifically adapted for the above-described prior apparatus in terms of its configuration and capacity when it is installed in the vehicle. The above-described apparatus is now so high in price that it is not ordinarily installed in the vehicle as its standard part. Also, the conventional master cylinder reservoir has only a port for communicating with the master cylinder, and the reservoir has a little capacity which is insufficient for the wheel slip control during the driving operation.

In addition, it is difficult to install the prior apparatus in the vehicle, because it is necessary to connect the apparatus with the master cylinder and wheel brake cylinder by pipes and also connect it with the master cylinder reservoir by a pipe. That is, those components such as various valves including a braking pressure control valve and a changeover valve, a reservoir, a fluid pump and the like are ordinarily assembled as a single assembly, and a port for communicating it with the master cylinder and another port for communicating it with the wheel brake cylinder are provided. Therefore, if it is necessary to communicate the fluid pump with the master cylinder reservoir, another port for communicating it with the master cylinder reservoir is needed. The accumulator disclosed in the Publication No. 4-215553 also requires the communication with the master cylinder reservoir.

In the case where the inlet port of the fluid pump is communicated with the passage between the master cylinder and the changeover valve, as disclosed in the above-described Publication No. 58-202142, it becomes easier to install the apparatus in the vehicle. However, it is necessary in this case to substitute a specific master cylinder reservoir which has a certain capacity sufficient for the slip control, for the conventional master cylinder reservoir.

SUMMARY OF THE INVENTION

Accordingly, it is an object of the present invention to provide a braking pressure control apparatus for controlling the wheel slip during a braking operation and the wheel slip during a driving operation, which may be easily installed in a conventional braking system of a vehicle without substituting a specific master cylinder reservoir for a conventional reservoir associated with a master cylinder.

In accomplishing the above and other objects, a braking pressure control apparatus is disposed in a vehicle braking system having a master cylinder and a wheel brake cylinder, which is communicated with the master cylinder through a fluid passage and operatively connected to a driven wheel, to control the wheel slip of the driven wheel during braking and driving operations. The apparatus has braking pressure control valve means which is disposed in the fluid passage between the master cylinder and the wheel brake cylinder, and selectively placed in one of at least a first position for supplying a brake fluid from the master cylinder to the wheel brake cylinder, and a second position for discharging the brake fluid from the wheel brake cylinder. The braking pressure control valve means is normally placed in the first position. Changeover valve means is disposed in the fluid passage between the master cylinder and the braking pressure control valve means. The changeover valve means is normally placed in an open position for allowing the flow of the brake fluid therethrough, and changed over to be placed in a closed position for blocking the flow of the brake fluid when the wheel slip of the driven wheel is controlled during the driving operation. First reservoir means is provided for defining a first variable volume chamber which stores the brake fluid discharged from the wheel brake cylinder through the braking pressure control valve means. The first variable volume chamber is normally urged to be of its minimum volume. Second reservoir means is provided for defining a second variable volume chamber which stores the brake fluid discharged from the wheel brake cylinder through the braking pressure control valve means. The second variable volume chamber is normally urged to expand for storing a predetermined amount of the brake fluid. And, pump means is provided for pumping the brake fluid from the first reservoir means and second reservoir means, and supplying the pumped brake fluid to the fluid passage between the braking pressure control valve means and the changeover valve means. The pump means is operated when the wheel slip of the driven wheel is controlled during the braking and driving operations.

It is preferable that the above-described apparatus further comprises holding means for holding the second variable volume chamber to define a predetermined volume during the braking operation.

In the above-described apparatus, the second reservoir means may include a housing, a wall member which is movably disposed in the housing for defining the second variable volume chamber between the wall member and the housing, first biasing means for biasing the wall member to reduce the volume of the second variable volume chamber, and second biasing means for biasing the wall member to increase the volume of the second variable volume chamber. The first biasing means has a larger biasing force than the second biasing means.

The above-described apparatus may further comprise retainer means for preventing the wall member from moving to reduce the volume of the second variable volume chamber less than the predetermined volume, and allowing the wall member to move against the biasing force of the first biasing means to increase the volume of the second variable volume chamber. The holding means may be arranged to include a movable member which is opened in response to the braking pressure generated in the master cylinder, and which prevents the wall member from moving to reduce the volume of the second variable volume chamber less than the predetermined volume during the braking operation.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
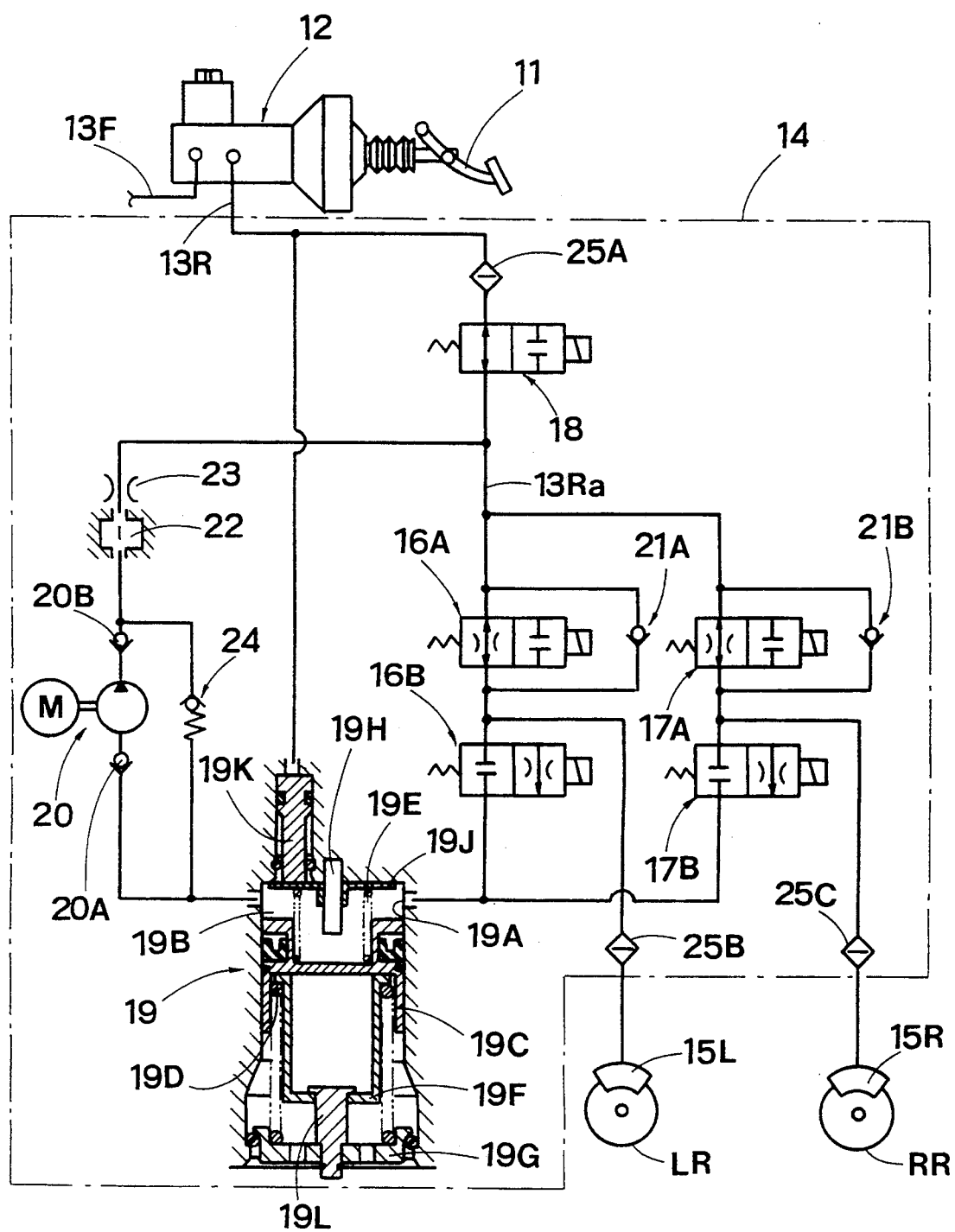
FIG.1 is a schematic diagram of an embodiment of the present invention.

Referring to FIG. 1, there is illustrated an embodiment of the present invention, which is connected to a conventional tandem master cylinder 12. The tandem master cylinder 12 has two fluid pressure chambers, one of which is in fluid communication with a wheel brake cylinder 15L which is operatively mounted on a left rear wheel LR (i.e., driven wheel in the present embodiment) and a wheel brake cylinder 15R which is operatively mounted on a right rear wheel RR (i.e., driven wheel) through a passage 13R, in which a braking pressure control apparatus 14 is provided. The other one of the two fluid pressure chambers is in fluid communication with wheel brake cylinders for left and right front wheels (i.e., non-driven wheels (not shown) in the present embodiment) through a passage 13F, in which another braking pressure control apparatus (not shown) is provided.

The braking pressure control apparatus 14 includes electromagnetic control valves 16A, 16B which serve as the braking pressure control valve means for the left rear wheel brake cylinder 15L, and electromagnetic control valves 17A, 17B which serve as the braking pressure control valve means for the right rear wheel brake cylinder 15R. The apparatus 14 also includes an electromagnetic control valve 18 which serves as the changeover valve means for blocking the fluid communication between the electromagnetic valves 16A, 17A and the master cylinder 12 when the wheel slip control is achieved during the driving operation or accelerating operation. The apparatus 14 further includes a reservoir 19 for storing a brake fluid discharged from the rear wheel brake cylinders 15R, 15L through the electromagnetic control valves 16B, 17B, and includes an electric motor pump 20 driven by a motor M for returning the brake fluid in the reservoir 19 to a passage 13Ra between the electromagnetic control valve 18 and the electromagnetic control valves 16A, 17A.

The electromagnetic control valves 16A, 17A are normally placed in the open positions, whereas they are closed when they are energized. The electromagnetic control valves 16B, 17B are normally placed in the closed positions, whereas they are opened when they are energized. The electromagnetic control valve 18 is normally placed in its open position, whereas it is closed when it is energized. Check valves 21A, 21B are disposed so as to bypass the electromagnetic control valves 16A, 17A when a brake pedal 11 is released from its depressed condition, so that the brake fluid in the rear wheel brake cylinders 15R, 15L is immediately fed into the master cylinder 12, even if the valves 16A, 17A are placed in the closed positions.

The reservoir 19 includes a cylinder 19A which is formed in a housing as shown in FIG. 1, and a piston 19C which is slidably and fluid-tightly received in the cylinder 19A to form a brake fluid chamber 19B in the cylinder 19A, and which serves as a wall member. The piston 19C is biased by a strong spring 19D so as to reduce a volume in the brake fluid chamber 19B, and also biased by a weak spring 19E so as to increase the volume in the brake fluid chamber 19B. The strong spring 19D is disposed between retainers 19F, 19G to be expandable until it expands to a predetermined length, and the biasing force of the spring 19D is applied to the piston 19C, so that the piston 19C is normally held at a position as shown in FIG. 1 by means of the springs 19D, 19E. The retainer 19F is slidably guided by a connecting member 19L, one end of which is secured to the retainer 19G and the other one end of which is formed with a flange portion engageable with the retainer 19F. The retainer 19G is fixed to the housing, so that the retainer 19F is prevented from moving further toward the closed end of the cylinder 19A when the flange portion of the connecting member 19L engages with the retainer 19F.

The volume of the brake fluid chamber 19B defined as shown in FIG. 1 corresponds to an amount of brake fluid which is required for the wheel slip control during the driving operation. The weak spring 19E is disposed between the piston 19C and a movable retainer plate 19J which is slidably guided by a pin 19H secured to the housing. Thus, the strong spring 19D serves as first biasing means or a first spring, while the weak spring 19E serves as second biasing means or a second spring.

As shown in FIG. 1, a piston 19K which serves as a movable member is disposed to abut on the retainer plate 19J and move toward the piston 19C in response to the braking pressure generated from the master cylinder 12. When the braking pressure is applied to the piston 19K, the piston 19K presses the piston 19C through the retainer plate 19J and holds the piston 19C at a position as shown in FIG. 1 to prevent the piston 19C from moving to reduce the volume of the chamber 19B.

The electric motor pump 20 of so-called self-supply type is arranged to introduce the brake fluid in the brake fluid chamber 19B of the reservoir 19 through a check valve 20A, and return it to the passage 13Ra between the valve 18 and the valves 16A, 17A, through a check valve 20B, a damper chamber 22 for damping a pulsation of the flow of brake fluid, and an orifice 23. A relief valve 24 is also provided for returning the brake fluid to a passage at the inlet side of the pump 20 when the discharging pressure of the pump 20 exceeds a predetermined value. Filters 25A, 25B, 25C as shown in FIG. 1 are provided so as to prevent a dust or the like created in the master cylinder 12 and rear wheel brake cylinders 15R, 15L from being introduced into the braking pressure control apparatus 14.

According to the present embodiment as structured above, in the normal condition, the electromagnetic control valves 16A, 16B, 17A, 17B and 18 are positioned as shown in FIG. 1, and the electric motor pump 20 is not operated. Therefore, when the brake pedal 11 is depressed for braking the vehicle, the pressurized brake fluid in the master cylinder 12 is fed to the left rear wheel brake cylinder 15L through the filter 25A, the electromagnetic control valves 18, 16A and the filter 25B, and fed to the right rear wheel brake cylinder 15R through the filter 25A, the valves 18, 17A and the filter 25C, respectively, so that the braking force is applied to each of the left and right rear wheels.

When it is determined in an electronic controller (not shown) during the braking operation that the increasing operation of the braking force applied to the left rear wheel LR (and/or right rear wheel RR) has to be terminated, the electromagnetic control valve 16A (and/or valve 17A) is energized to be placed in its closed position, so that the supply of the pressurized brake fluid to the left rear wheel brake cylinder 15L (and/or right rear wheel brake cylinder 15R) is terminated to thereby stop increasing the braking force applied to the left rear wheel LR (and/or right rear wheel RR).

When it is determined in the electronic controller that the braking force applied to the left rear wheel LR (and/or right rear wheel RR) has to be reduced, the electromagnetic control valve 16B (and/or valve 17B) is energized to be placed in its open position, so that the brake fluid in the left rear wheel brake cylinder 15L (and/or right rear wheel brake cylinder 15R) is discharged to the reservoir 19 through the electromagnetic control valve 16B (and/or valve 17B) to decrease the braking force applied to the left rear wheel LR (and/or right rear wheel RR).

Next, when it is determined in the electronic controller that the decreasing operation of the braking force applied to the left rear wheel LR (and/or right rear wheel RR) has to be terminated, the electromagnetic control valve 16B (and/or valve 17B) is de-energized to return to its closed position, so that the brake fluid in the left rear wheel brake cylinder 15L (and/or right rear wheel brake cylinder 15R) is prevented from being discharged to stop decreasing the braking force applied to the left rear wheel LR (and/or right rear wheel RR).

Then, when it is determined in the electronic controller that the braking force applied to the left rear wheel LR (and/or right rear wheel RR) has to be increased, the electromagnetic control valve 16A (and/or valve 17A) is de-energized to return to its open position, so that the supply of the brake fluid from the master cylinder 12 to the left rear wheel brake cylinder 15L (and/or right rear wheel brake cylinder 15R) is initiated again to increase the braking force applied to the left rear wheel LR (and/or right rear wheel RR).

In general, the electronic controller (not shown) actuates the electric motor pump 20 before energizing the electromagnetic control valve 16B (and/or valve 17B). Therefore, the brake fluid fed into the brake fluid chamber 19B of the reservoir 19 from the valve 16B (and/or valve 17B) is returned to the passage 13Ra between the valve 18 and the valves 16A, 17A by means of the electric motor pump 20, and then returned to the master cylinder 12 through the electromagnetic control valve 18. During this operation, if the amount of the brake fluid fed from the valves 16B, 17B is greater than the amount of the brake fluid discharged to the pump 20, the piston 19C of the reservoir 19 slides to move downward in FIG. 1, whereas if the amount of the brake fluid fed from the valves 16B, 17B is smaller than the amount of the brake fluid discharged to the pump 20, it slides to move upward in FIG. 1. However, during the braking operation, the piston 19K has been positioned downward from the position as shown in FIG. 1 to block the piston 19C, so that the piston 19C does not slide to move upward over the position as shown in FIG. 1.

In the driving operation of the vehicle, e.g., when the vehicle starts to move, if it is determined that the slip amount of the left rear wheel LR (and/or right rear wheel RR) has to be restricted, the electromagnetic control valve 18 is energized and the electric motor pump 20 is operated. Consequently, the brake fluid in the brake fluid chamber 19B of the reservoir 19 is fed to the left rear wheel brake cylinder 15L (and/or right rear wheel brake cylinder 15R) through the electromagnetic control valve 16A (and/or valve 17A) by means of the electric motor pump 20, so that the braking force is applied to the left rear wheel LR (and/or right rear wheel RR) to restrict the slip amount. In this case, since the master cylinder 12 has not generated the braking pressure, the piston 19K is positioned at the position as shown in FIG. 1, so that the piston 19C is movable upward in FIG. 1 to utilize the brake fluid in the brake fluid chamber 19B effectively.

Next, when it is determined in the electronic controller that the increasing operation of the braking force applied to the left rear wheel LR (and/or right rear wheel RR) has to be terminated, the electromagnetic control valve 16A (and/or valve 17A) is energized to be placed in its closed position, so that the supply of the brake fluid to the left rear wheel brake cylinder 15L (and/or right rear wheel brake cylinder 15R) is terminated to stop increasing the braking force applied to the left rear wheel LR (and/or right rear wheel RR).

Then, when it is determined in the electronic controller that the braking force applied to the left rear wheel LR (and/or right rear wheel RR) has to be reduced, the electromagnetic control valve 16B (and/or valve 17B) is energized to be placed in its open position, so that the brake fluid in the left rear wheel brake cylinder 15L (and/or right rear wheel brake cylinder 15R) is discharged to the reservoir 19 through the electromagnetic control valve 16B (and/or valve 17B) to decrease the braking force applied to the left rear wheel LR (and/or right rear wheel RR).

As described above, as long as the master cylinder 12 generates the braking pressure, the piston 19K of the reservoir 19 has been positioned downward in FIG. 1 to maintain the maximum volume of the brake fluid chamber 19B, so that even if the vehicle is changed from its braking operation to its driving operation and the slip control of the driven wheel is needed during the driving operation, the slip control can be achieved without delay. Thus, it is not necessary to provide a passage for communicating the electric motor pump 20 with the reservoir associated with the master cylinder 12. Accordingly, the braking pressure control apparatus 14 may be easily installed in the vehicle, and any specific master cylinder reservoir is not needed to be substituted for the conventional master cylinder reservoir.

In the above-described embodiment illustrated in FIG. 1, the strengths of the springs 19D, 19E in the reservoir 19 have been set to be different from each other. However, if the strengths of the springs 19D, 19E are set to be equal to each other when the piston 19C is positioned at the position as shown in FIG. 1, the retainer 19F and the connecting member 19H disposed between the retainers 19F and 19G may be omitted.

Figure 2:
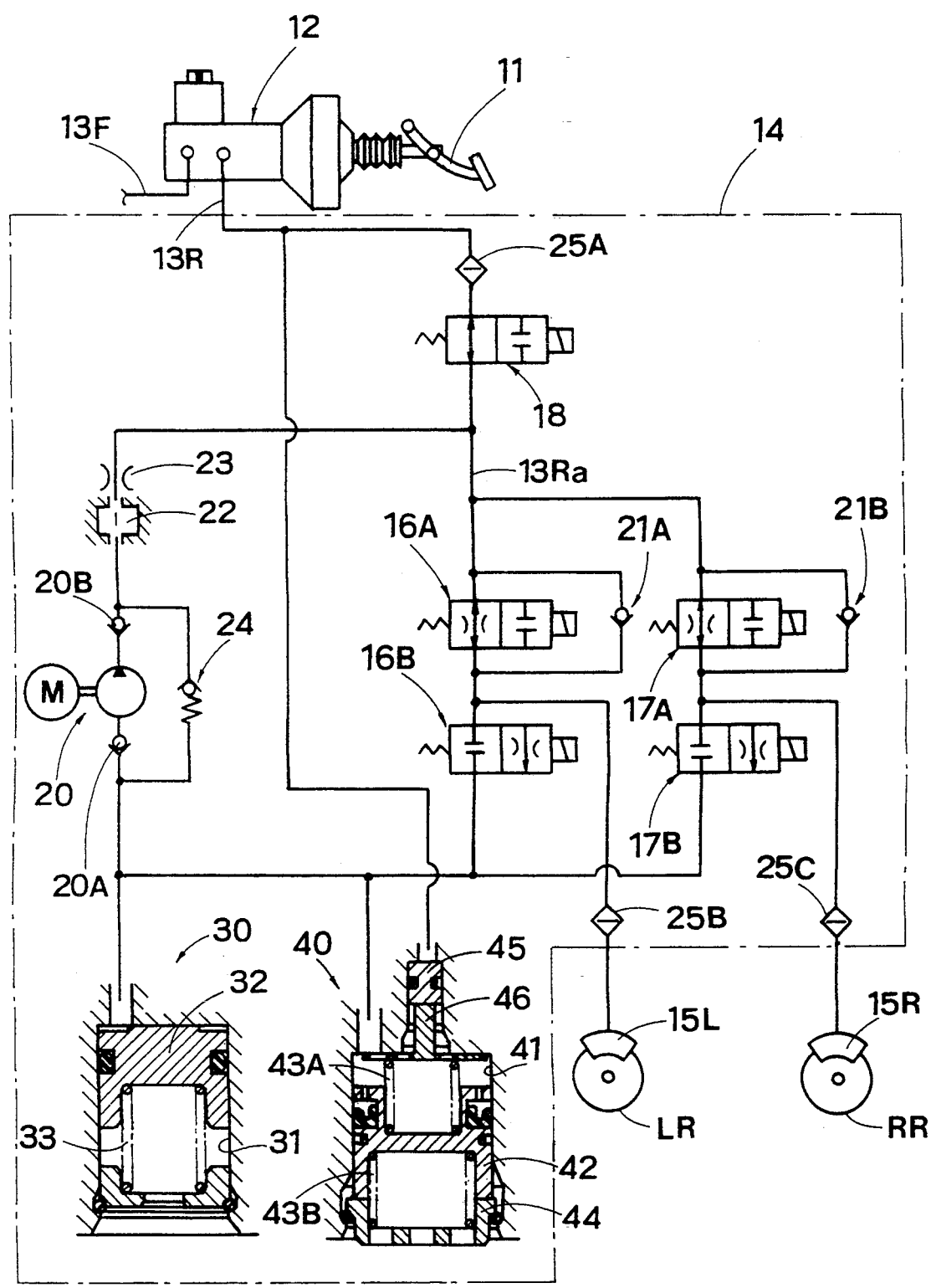
FIG.2 is a schematic diagram of another embodiment of the present invention.
Figure 3:
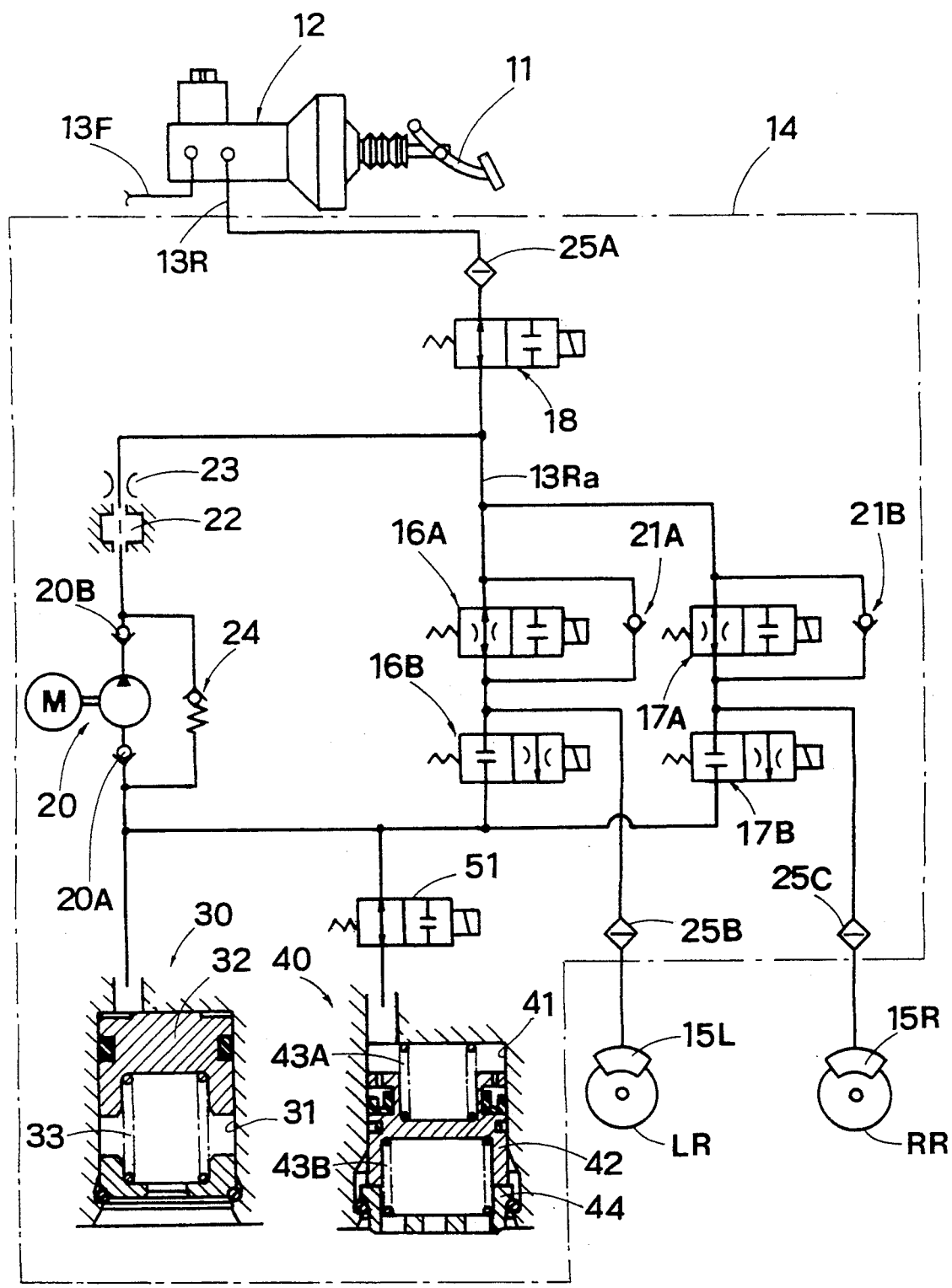
FIG.3 is a schematic diagram of further embodiment of the present invention.
Figure 4:
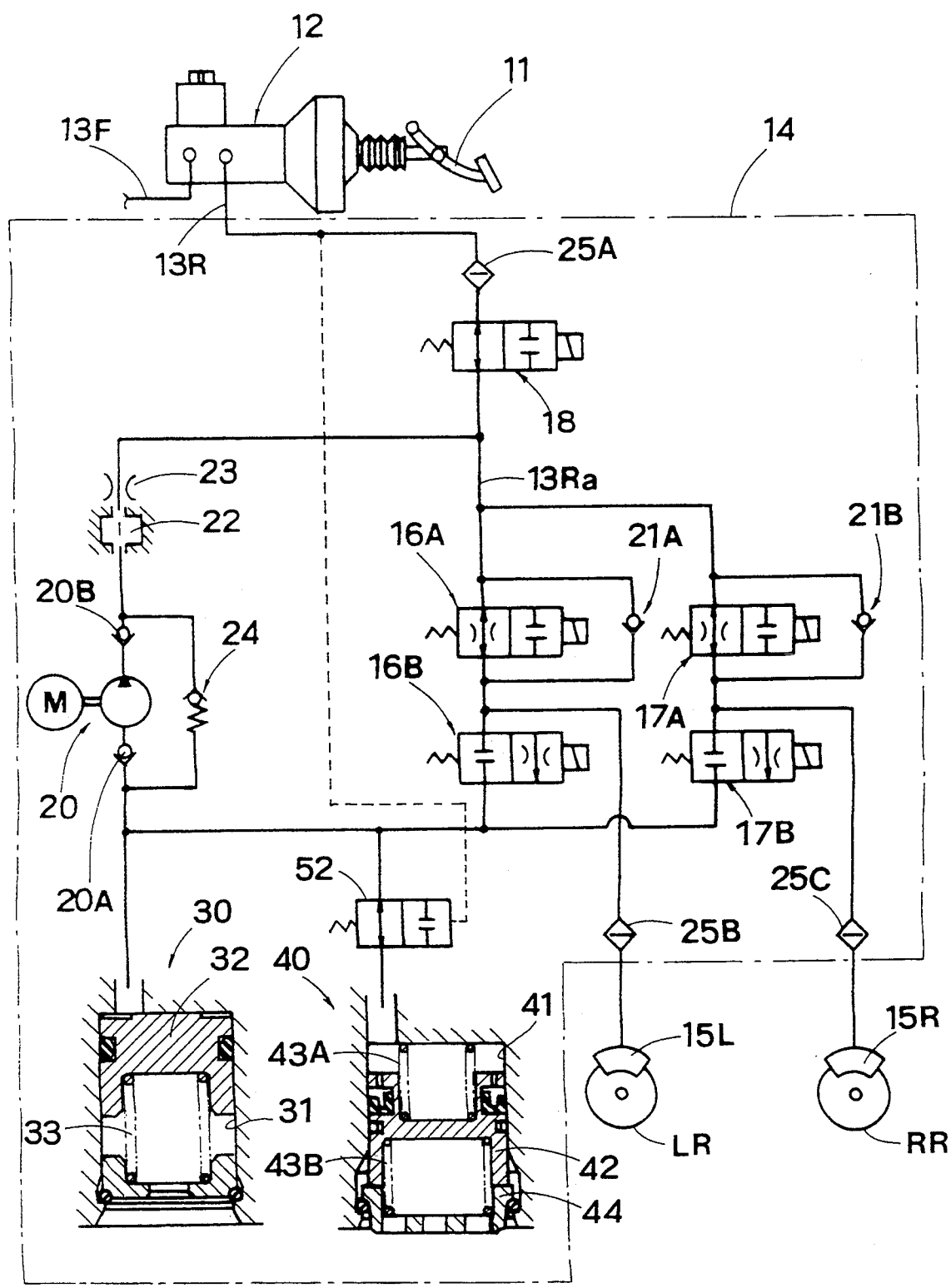
FIG.4 is a schematic diagram of yet further embodiment of the present invention.

While in the embodiment illustrated in FIG. 1, the single reservoir 19 serves as both the first reservoir means and second reservoir means according to the present invention, it is possible that those two reservoir means be formed separately, as illustrated in FIGS. 2, 3 and 4.

In FIG. 2, a first reservoir 30 and a second reservoir 40 are substituted for the reservoir 19 as shown in FIG. 1. The first reservoir 30 includes a cylinder 31, a piston 32 slidably and fluid-tightly received in the cylinder 31, and a spring 33 for biasing the piston 32 toward the closed end of the cylinder 31 to urge a first chamber defined between the cylinder 31 and piston 32 to be of its minimum volume. The second reservoir 40 has a cylinder 41, a piston 42 slidably and fluid-tightly received in the cylinder 41, springs 43A, 43B for biasing the piston 42 to be normally held at a position as shown in FIG. 2, and a retainer 44 preventing the piston 42 from moving to increase the volume of a second chamber defined between the cylinder 41 and piston 42 more than a predetermined volume. Also provided in the second reservoir 40 is a piston 45 which corresponds to the piston 19K as shown in FIG. 1 and functions in the same manner as the piston 19K. A movable retainer member 46 corresponding to the movable retainer plate 19J is provided to be associated with the piston 45. The remaining structure in FIG. 2 is essentially the same as that illustrated in FIG. 1, so that its explanation will be omitted.

According to the embodiment illustrated in FIG. 2, when the wheel slip control during the braking operation is achieved, the brake fluid discharged from the wheel brake cylinders 15L, 15R is stored in the reservoir 30 and returned to the passage 13Ra by means of the electric motor pump 20. In this case, however, the brake fluid is not discharged from the reservoir 40 to maintain therein a predetermined amount of the brake fluid, because the piston 45 (and the retainer member 46) blocks the movement of the piston 42 to reduce the volume of the second chamber. When the wheel slip control during the driving operation is initiated, the piston 45 is not applied with the braking pressure from the master cylinder 12 which is not operated, so that the piston 42 is free from moving toward the closed end of the cylinder 41. Consequently, the brake fluid stored in the reservoir 40 is returned to the passage 13Ra by means of the pump 20, even though no brake fluid is stored in the reservoir 30.

In the illustrated embodiments, the piston 19K (or piston 45) which moves in response to the braking pressure generated from the master cylinder 12 serves as holding means for holding the piston 19C, which serves as the wall member of the second reservoir, at the position to provide the maximum volume of the second reservoir. However, it is possible to detect the braking condition of the vehicle by means of an electric switch actuated in response to depression of the brake pedal 11, an electric switch actuated in response to the braking pressure generated from the master cylinder 12, or the like, and move the piston 19K electromagnetically. Or, if the apparatus is so arranged to hold the electromagnetic valves 16B, 17B in their open positions and hold the master cylinder 12 in communication with the brake fluid chamber 19B for a predetermined time period after the braking pressure control during the braking operation of the vehicle was terminated, it is possible to eliminate the piston 19K.

In the case where the first reservoir means and the second reservoir means are formed separately as illustrated in FIG. 2, if a changeover valve is provided for blocking the brake fluid fed into and discharged from the second reservoir means during the braking operation of the vehicle, it is also possible to eliminate the piston 45 (and the retainer member 46), as in the embodiments illustrated in FIGS. 3 and 4.

In FIGS. 3 and 4, the reservoir 40 is not provided with the piston 45 (and the retainer member 46) illustrated in FIG. 2, whereas an electromagnetic control valve 51 is provided in FIG. 3, and a pilot valve 52 is provided in FIG. 4, for serving as the changeover valve, respectively. The electromagnetic control valve 51 in FIG. 3 is controlled by the electronic controller in response to an output signal of one of the above-described electric switches. The valve 51 is arranged to be normally open as shown in FIG. 3 and energized to be placed in its closed position during the braking operation, whereby the communication between the reservoir 40 and the pump 20 is blocked to prevent the brake fluid from being discharged from the reservoir 40. The pilot valve 52 in FIG. 4 is a changeover valve which is actuated in response to the braking pressure generated from the master cylinder 12 and served as a pilot pressure, and which is placed in its closed position during the braking operation, to thereby prevent the brake fluid from being discharged from the reservoir 40. The remaining structure in FIG. 3 or FIG. 4 is the same as that illustrated in FIG. 2, so that its explanation will be omitted.

Although the braking pressure control valve means in the illustrated embodiment is constituted by a pair of electromagnetic control valves 16A, 16B (or 17A, 17B) each of which is placed in either the open position or the closed position, it is possible to use an electromagnetic valve which is placed in one of a first position for allowing the brake fluid to flow from the master cylinder to the wheel brake cylinder, a second position for blocking the flow of brake fluid out of and into the wheel brake cylinder, and a third position for allowing the brake fluid to flow from the wheel brake cylinder to the reservoir.

It will be obvious that numerous and various other arrangements can be readily devised by those skilled in the art in view of the foregoing teaching, without departing from the spirit and scope of the invention as defined in the following claims.

What is claimed is:

1. A braking pressure control apparatus disposed in a vehicle braking system having a master cylinder and a wheel brake cylinder communicated with said master cylinder through a fluid passage and operatively connected to a driven wheel, for controlling the wheel slip of said driven wheel during braking and driving operations, comprising;
    braking pressure control valve means disposed in the fluid passage between said master cylinder and said wheel brake cylinder, and selectively placed in one of at least a first position for supplying a brake fluid from said master cylinder to said wheel brake cylinder, and a second position for discharging the brake fluid from said wheel brake cylinder, said braking pressure control valve means normally placed in said first position;
    changeover valve means disposed in the fluid passage between said master cylinder and said braking pressure control valve means, said changeover valve means normally placed in an open position for allowing the flow of the brake fluid therethrough, and changed over to be placed in a closed position for blocking the flow of the brake fluid when the wheel slip of said driven wheel is controlled during the driving operation;
    first reservoir means having a first variable volume chamber for storing the brake fluid discharged from said wheel brake cylinder through said braking pressure control valve means, said first variable volume chamber normally urged to be of the minimum volume thereof;
    second reservoir means having a second variable volume chamber for storing the brake fluid discharged from said wheel brake cylinder through said braking pressure control valve means, said second variable volume chamber normally urged to expand for storing a predetermined amount of the brake fluid; and
    pump means for pumping the brake fluid from said first reservoir means and second reservoir means, and supplying the pumped brake fluid to the fluid passage between said braking pressure control valve means and said changeover valve means, said pump means operated when the wheel slip of said driven wheel is controlled during braking and driving operations.

2. A braking pressure control apparatus according to claim 1, further comprising holding means for holding said second variable volume chamber to define a predetermined volume during the braking operation.

3. A braking pressure control apparatus according to claim 2, wherein said second reservoir means includes a housing, a wall member movably disposed in said housing for defining said second variable volume chamber between said wall member and said housing, first biasing means for biasing said wall member to reduce the volume of said second variable volume chamber, and second biasing means for biasing said wall member to increase the volume of said second variable volume chamber, said first biasing means having a larger biasing force than said second biasing means.

4. A braking pressure control apparatus according to claim 3, further comprising retainer means for preventing said wall member from moving to reduce the volume of said second variable volume chamber less than said predetermined volume, and allowing said wall member to move against the biasing force of said first biasing means to increase the volume of said second variable volume chamber.

5. A braking pressure control apparatus according to claim 3, wherein said holding means includes a movable member operated in response to the braking pressure generated in said master cylinder, for preventing said wall member from moving to reduce the volume of said second variable volume chamber less than said predetermined volume during the braking operation.

6. A braking pressure control apparatus according to claim 3, wherein said holding means includes an electromagnetic device actuated in accordance with the braking operation, for preventing said wall member from moving to reduce the volume of said second variable volume chamber.

7. A braking pressure control apparatus according to claim 3, wherein said holding means includes valve means for blocking the communication of said second variable volume chamber with said braking pressure control means and said pump means during the braking operation.

8. A braking pressure control apparatus according to claim 3, wherein said housing, said wall member and said first biasing means of said second reservoir means constitutes said first reservoir means, and wherein said first variable volume chamber is defined between said wall member and said housing.

9. A braking pressure control apparatus according to claim 8, wherein said holding means includes a movable member operated in response to the braking pressure generated in said master cylinder, for preventing said wall member from moving to reduce the volume of said first variable volume chamber.

10. A braking pressure control apparatus disposed in a vehicle braking system having a master cylinder and a wheel brake cylinder communicated with said master cylinder through a fluid passage and operatively connected to a driven wheel, for controlling the wheel slip of said driven wheel during braking and driving operations, comprising;
    braking pressure control valve means disposed in the fluid passage between said master cylinder and said wheel brake cylinder, and selectively placed in one of at least a first position for supplying a brake fluid from said master cylinder to said wheel brake cylinder, and a second position for discharging the brake fluid from said wheel brake cylinder, said braking pressure control valve means normally placed in said first position;

a changeover valve disposed in the fluid passage between said master cylinder and said braking pressure control valve means, said changeover valve normally placed in an open position for allowing the flow of the brake fluid therethrough, and changed over to be placed in a closed position for blocking the flow of the brake fluid when the wheel slip of said driven wheel is controlled during the driving operation;

a reservoir having a cylinder formed therein and communicated with said wheel brake cylinder;

a piston slidably and fluid-tightly disposed in said cylinder of said reservoir for defining a variable volume chamber between said piston and said cylinder;

a first spring for biasing said piston to reduce the volume of said variable volume chamber;

a second spring for biasing said piston to increase the volume of said variable volume chamber, said first spring having a larger biasing force than said second spring;

retainer means for preventing said piston from moving to reduce the volume of said variable volume chamber less than a predetermined volume, and allowing said piston to move against the biasing force of said first spring to increase the volume of said variable volume chamber;

a holding means for holding said piston to define said predetermined volume during the braking operation; and a fluid pump for pumping the brake fluid from said reservoir, and supplying the pumped brake fluid to the fluid passage between said braking pressure control valve means and said changeover valve, said fluid pump operated when the wheel slip of said driven wheel is controlled during braking and driving operations.

11. A braking pressure control apparatus according to claim 10, wherein said holding means includes a movable member operated in response to the braking pressure generated in said master cylinder, for preventing said piston from moving to reduce the volume of said variable volume chamber less than said predetermined volume.

12. A braking pressure control apparatus according to claim 11, further comprising a retainer plate disposed between said piston and said cylinder for supporting said second spring, one end of said movable member abutting on said retainer plate to move said retainer plate toward said piston against the biasing force of said second spring.

* * * * *